(12) United States Patent
Clark

(10) Patent No.: US 10,953,980 B2
(45) Date of Patent: Mar. 23, 2021

(54) AIRCRAFT ASSEMBLY WITH SAFETY GUIDE

(71) Applicant: SAFRAN LANDING SYSTEMS UK LTD, Gloucester (GB)

(72) Inventor: Ben Clark, Gloucester (GB)

(73) Assignee: Safran Landing Systems UK LTD

( * ) Notice: Subject to any disclaimer, the term of this patent is extended or adjusted under 35 U.S.C. 154(b) by 349 days.

(21) Appl. No.: 16/027,999

(22) Filed: Jul. 5, 2018

(65) Prior Publication Data

US 2019/0016445 A1 Jan. 17, 2019

(30) Foreign Application Priority Data

Jul. 17, 2017 (EP) .................................. 17181619

(51) Int. Cl.
| | | |
|---|---|---|
| *B64C 25/12* | (2006.01) | |
| *F16L 3/015* | (2006.01) | |
| *B64C 25/00* | (2006.01) | |
| *F16B 37/14* | (2006.01) | |

(52) U.S. Cl.
CPC .............. *B64C 25/12* (2013.01); *B64C 25/00* (2013.01); *F16L 3/015* (2013.01); *F16B 37/14* (2013.01)

(58) Field of Classification Search
CPC ......... B64C 25/00; B64C 25/10; B64C 25/12; B64C 25/16; F16B 37/14; F16L 3/015
USPC ...................... 411/92, 95, 97, 102
See application file for complete search history.

(56) References Cited

U.S. PATENT DOCUMENTS

| | | | | |
|---|---|---|---|---|
| 2010/0163689 A1* | 7/2010 | Long | ................... | B25J 19/0029 248/49 |
| 2010/0175495 A1* | 7/2010 | Pan | ........................ | B25J 9/0009 74/490.02 |
| 2017/0113811 A1* | 4/2017 | Cokonaj | ................ | B64C 25/10 |
| 2017/0361924 A1* | 12/2017 | Himmelmann | ......... | B64C 25/02 |

FOREIGN PATENT DOCUMENTS

EP    3020984 A1 *   5/2016   .............. F16B 39/08

OTHER PUBLICATIONS

European Search Report for European Application No. 17181619.2, dated Mar. 23, 2018—6 pages.

* cited by examiner

*Primary Examiner* — Philip J Bonzell
*Assistant Examiner* — Tye William Abell
(74) *Attorney, Agent, or Firm* — RatnerPrestia

(57) ABSTRACT

An aircraft assembly having: a first part; a second part, the first part being movably mounted relative to a second part; a dynamic conduit arranged such that movement of the first part relative to the second part causes the dynamic conduit to move through a movement volume from a first conduit position to a second conduit position; a first fastener arranged to couple a component to the aircraft assembly, at least some of the first fastener residing within the movement volume of the dynamic conduit; and a safety guide arranged to be coupled to the first fastener, the safety guide comprising a bridge portion which extends away from the first fastener within the movement volume of the dynamic conduit so as to support the dynamic conduit when the dynamic conduit is in the second conduit position.

20 Claims, 14 Drawing Sheets

AIRCRAFT ASSEMBLY WITH SAFETY GUIDE

This application claims the benefit of and priority to European Application No. EP 17181619.2, filed on Jul. 17, 2017, the contents of which are incorporated herein by reference.

BACKGROUND OF THE INVENTION

Many types of aircraft assembly include a first part which is movable relative to a second part.

An aircraft assembly can also include one or more hoses or cables for conducting fluid or electricity respectively to one or more components of the assembly. For brevity such hoses or cables will be referred to herein as conduits.

As the first part of the assembly moves relative to the second part, it can cause the conduit to move through a movement volume from a first conduit position to a second conduit position. Such conduits can be referred to as dynamic conduits.

An aircraft assembly can also include components such as sensors, brackets and the like which are coupled to the assembly via one or more mechanical fasteners; for example, by way of nut and bolts.

In the case of an aircraft assembly nut and bolt fastener, it is common for the threaded rod of a bolt to be provided with a hole that extends laterally from one side of the rod to the other. The nut can have an axial face configured to define castellations and is wound until the hole is axially aligned with a space between adjacent castellations. A split pin is then inserted through the hole. The head of the split pin defines an end stop, limiting travel through the hole. The free ends of the split pin are then bent or splayed apart to inhibit removal of the split pin. The split pin inhibits reverse rotation of the nut due to engagement with the castellations.

An aircraft can include sharp edges, such as the tips of a split pin. The sharp edges of a fastener can cause damage to relatively soft articles such as fabric or rubber that come into contact with the sharp edges.

In view of design and assembly considerations, one or more of the fasteners can reside within the movement volume of the dynamic conduit. Thus, the dynamic conduit can brush against the fastener(s) as the first part of the assembly moves relative to the second part, which can abrade the dynamic conduit.

It is known to cap fasteners with sealant so that sharp surfaces such as the tips of splayed split pin arms are encased in a protective coating.

However, the present inventor has identified that known solutions to the above-identified problem can be time consuming to implement, can be unreliable in view of the potential for wear and can be sacrificial in nature requiring periodic reapplication.

SUMMARY OF THE INVENTION

According to a first aspect of the invention there is provided an aircraft assembly having a first part, a second part, the first part being movably mounted relative to a second part, a dynamic conduit arranged such that movement of the first part relative to the second part causes the dynamic conduit to move through a movement volume from a first conduit position to a second conduit position, a first fastener arranged to couple a component to the aircraft assembly, at least some of the first fastener residing within the movement volume of the dynamic conduit, and a safety guide arranged to be coupled to the first fastener, the safety guide comprising a bridge portion which extends away from the first fastener within the movement volume of the dynamic conduit so as to support the dynamic conduit when the dynamic conduit is in the second conduit position.

Thus, the aircraft assembly according to the first aspect of the invention includes a safety guide which serves two purposes. Firstly, safety guide encases one or more sharp external surfaces of the first fastener to prevent the dynamic conduit contacting the sharp surfaces as it moves in use. Secondly, the bridge portion provides an elevated guide surface, which can prevent the dynamic conduit from contacting one or more lower level surfaces of the aircraft assembly adjacent the fastener. The bearing surface of the bridge portion can be relatively smooth or flat in comparison to the lower level surfaces of the aircraft assembly adjacent the fastener. This can reduce dynamic conduit abrasion relative to known arrangements.

The assembly can comprise a second fastener and the safety guide can comprise a first cap portion arranged to be mounted on the first fastener and a second cap portion arranged to be mounted on the second fastener, the bridge portion extending between and connecting the first cap portion and the second cap portion.

The safety guide can be bespoke to the aircraft assembly.

The bridge portion can be coupled to each cap portion at or adjacent to the top of each cap portion. This can prevent the dynamic conduit from 'bumping' over a cap portion when moving though the movement volume along the bridge portion, thereby reducing abrasion.

The bridge portion can have a generally planar supporting surface arranged in use to act as a bearing surface for the dynamic conduit as it moves though the movement volume along the bridge portion.

At least a central portion of the bridge portion can be relatively narrow in comparison to the outer width of the cap portions. This can provide a lightweight safety guide. In other embodiments the bridge portion can be wider than the cap portion(s) to support the dynamic conduit through a wider movement volume.

The width of the bridge portion can taper inwardly from the cap portions towards the relatively narrow central portion. This can provide a smooth conduit transition along the safety guide.

The safety guide can be removably attachable to the fasteners.

Each cap portion can be arranged to cover or encase the free ends of an installed split pin. Each cap portion can have a body comprising one or more side wall which together define a bore arranged to receive an end portion of a rod, diametrically opposing first and second openings formed through the one or more side walls, each opening being sized to receive the arms of the split pin when the split pin is in an insertion condition to permit the arms of the split pin to be inserted through a lateral hole in the rod, and at least one recess sized to receive the free ends of the split pin when the split pin is in an installed condition, wherein the body includes a retention portion situated between the first opening and an end face of the one or more side walls, the retention portion serving to retain the cap portion on the rod when the split pin is in the installed condition.

The second opening can be elongate and can define the recess. This gives rise to a simplified and efficient arrangement.

The second opening can extend in a generally orthogonal plane with respect to the axis of the bore. This arrangement provides increased surface area which works with the assembled split pin to inhibit removal of the cap portion.

Alternatively, the second opening can extend in a generally parallel plane with respect to the axis of the bore. This enables the free end of the split pin to be bent apart in a plane which is generally parallel with respect to the bore axis. This is particularly advantageous in cases where the split pin is being used to retain a castellated nut because both arms of the pin react attempted unwinding of the nut in parallel and through their thickest dimension.

Where the opening extends in a generally parallel plane with respect to the axis of the bore, the opening can extend throughout the height of the body. This can provide a recess of maximum volume for receiving the bent ends of the pin.

The inner sidewalls of the body which define the bore are configured to define a bore with a generally hexagonal cross section.

The recess may extend through the one or more side walls. This configuration enables the ends of the pin to be shielded by the side walls, which simplifies the arrangement and enables the ends of the pin to be fully bent around the rod in the installed position.

The body may include an inwardly extending flange or cover arranged to limit axial travel of the rod through the bore.

The flange or cover can help in aligning the cap openings with the rod hole when seating the split pin safety cap.

The body may comprise a single, generally cylindrical side wall. This gives rise to a simplified and efficient arrangement.

The safety guide can be of unitary construction.

The safety guide can be formed from a plastics material, or a metal such as aluminum. Forming the body from a plastics material is advantageous as it provides a strong, low friction cover. A metal such as aluminum is preferred where the cap openings are vertical and extend throughout the height of the body for rigidity.

The assembly can be an aircraft landing gear assembly.

In accordance with a further aspect of the invention, there is provided an aircraft including one or more aircraft assemblies according to the first aspects.

In accordance with a further aspect of the invention, there is provided a method of forming an aircraft assembly, comprising the steps of: placing a safety guide according to the first aspect on one or both of a pair of fasteners.

The method can comprise steps of: aligning first and second cap portion openings with a lateral hole; inserting a split pin through the first and second cap openings of both cap portions and the respective lateral holes; and bending the free ends of the split pins into respective one or more recesses in the respective cap portions.

BRIEF DESCRIPTION OF THE DRAWINGS

Embodiments of the invention will now be described with reference to the accompanying drawings, in which.

DETAILED DESCRIPTION OF EMBODIMENTS

Figure 1:
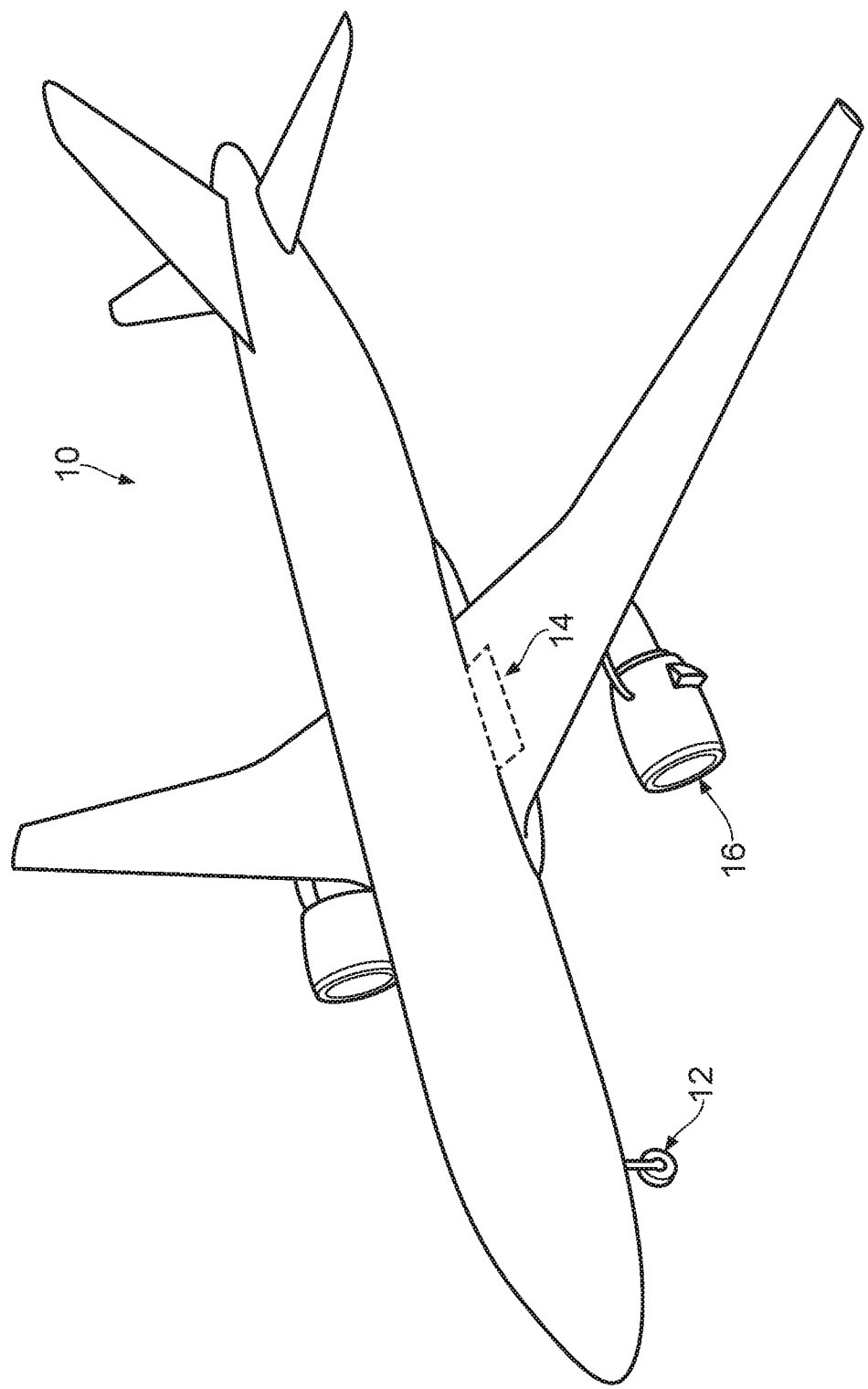
FIG. 1 is a diagram of an aircraft.

FIG. 1 is a diagram of an aircraft 10. The aircraft 10 includes assemblies such as a nose landing gear 212, main landing gear 14 and engines 16. Other aircraft assemblies will be apparent to the skilled person. An aircraft assembly can be a group of interconnected parts which are arranged to be fitted to one or more other aircraft assemblies as a unit. The term aircraft as used herein includes aeroplanes, helicopters, UAVs and the like.

Referring now to FIGS. 2a to 2e, an aircraft assembly, namely an aircraft landing gear assembly, is shown generally at 14. The landing gear assembly 14 includes a foldable stay 18, a lock link 20 and a down lock spring assembly 22 mounted to the stay 18 and arranged to urge the lock link 20 to assume a locked state. The landing gear assembly also includes a main shock absorber strut 24, comprising a main fitting 26 and a sliding tube 28, as well as a wheel and brake assembly 30.

The aircraft landing gear assembly is movable between a deployed condition, for take-off and landing, and a stowed condition for flight. An actuator (not shown) is provided for moving the landing gear between the deployed condition and the stowed condition. This actuator is known in the art as a retraction actuator, and more than one can be provided. A retraction actuator may have one end coupled to the airframe and another end coupled to the main strut such that extension and retraction of the actuator results in movement of the main strut between deployed and stowed conditions.

Figure 2A:
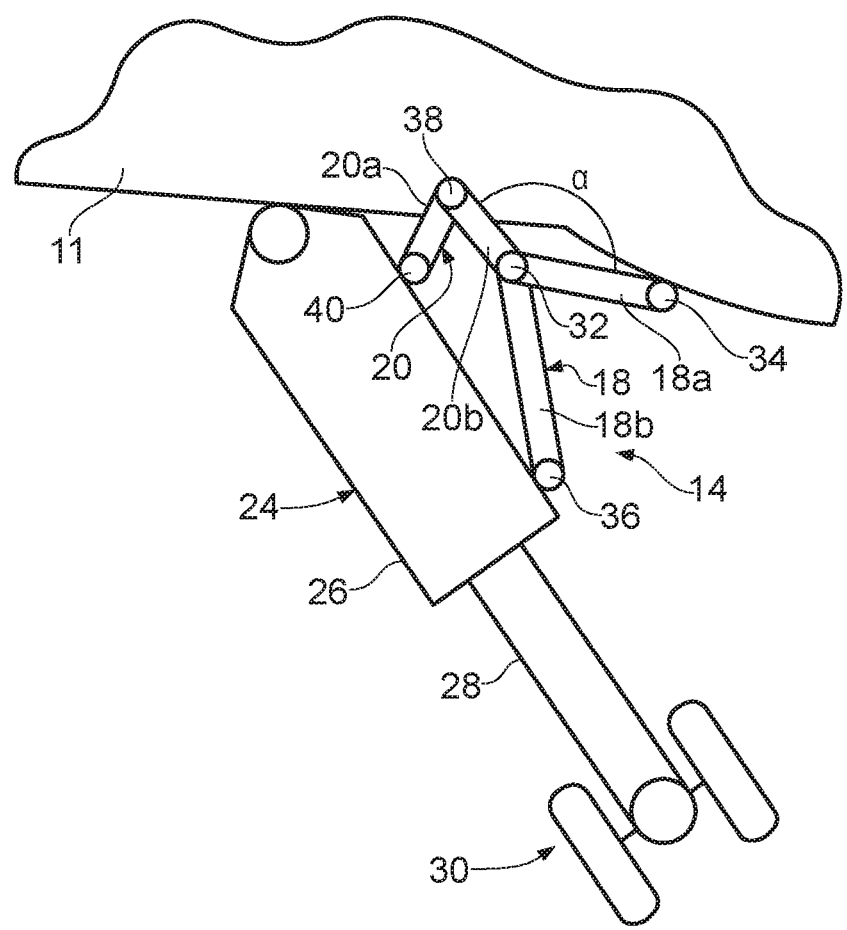
FIGS. 2a to 2e are diagrams an aircraft landing gear assembly.

The stay 18 serves to support the orientation of the main fitting 26 when the landing gear is in the deployed condition. The stay 18 generally includes a two bar linkage that can be unfolded to assume a generally straight or aligned, over centre condition in which the stay 18 is locked to inhibit movement of the main fitting, as shown in FIGS. 2c and e. When the stay is broken, it no longer reacts pivotal movement of the main fitting 26 and the main fitting 26 can be moved by the retraction actuator towards the stowed condition, as shown in FIG. 2a. During flight the stay 18 is arranged in the folded condition, while during take-off and landing the stay 18 is arranged in the generally straight or aligned condition. Some main landing gear assemblies include a pair of stays coupled to a common shock absorbing strut.

The stay 18 has an elongate upper stay arm 18a having a lower end defining a pair of lugs pivotally coupled via a pivot pin 32 to a pair of lugs defined at an upper end of an elongate lower stay arm 18b. The stay arms 18a and 18b may therefore pivotally move relative to one another about the pivot pin 32. The upper end of the upper stay arm 18a defines a pair of lugs that are pivotally coupled to a lug of a connector 34 which in turn is pivotally coupled to the airframe 11. The lower end of the lower stay arm 18b defines a pair of lugs pivotally coupled to a lug of a connector 36 which in turn is pivotally coupled to the main fitting 26.

The lock link 20 has an elongate upper link arm 20a having a lower end pivotally coupled to an upper end of an elongate lower link arm 20b via a pivot pin 38. The link arms 20a, 20b may therefore pivotally move relative to one another about the pivot pin 38. An upper end of the upper link arm 20a defines a pair of lugs that are pivotally coupled to a lug of a connector 40 which in turn is pivotally coupled to the main strut 26. A lower end of the lower link arm 20b defines a lug that is pivotally coupled to lugs of the stay arms 18a, 18b via the pivot pin 32. Lugs of the upper stay arm 18a are disposed between the lugs of the lower stay arm 18b and the lugs of the lower link arm 20b.

Figure 2B:
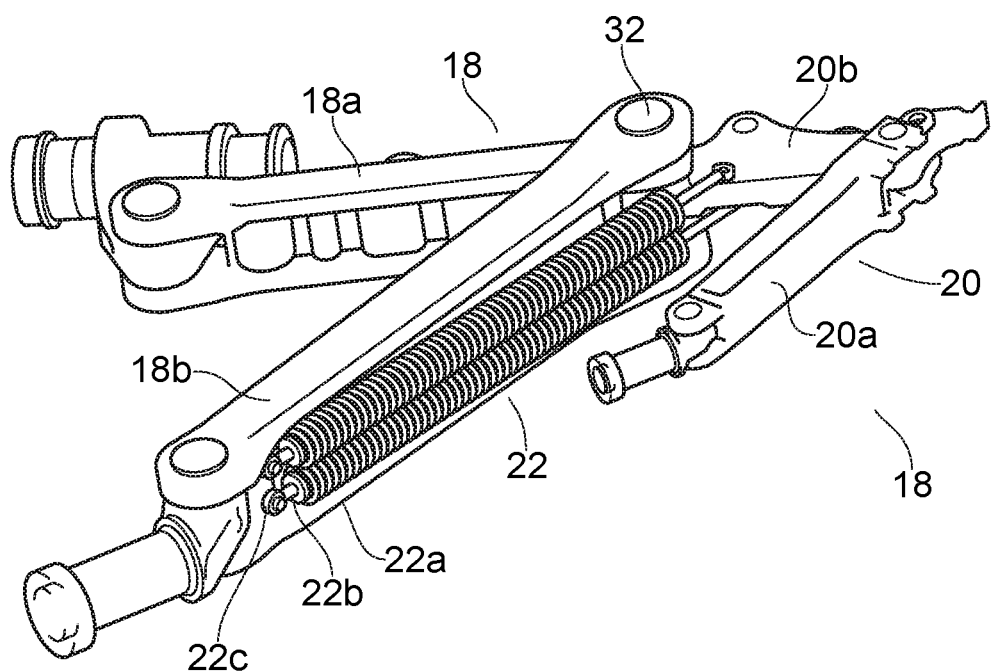
Figure 2C:
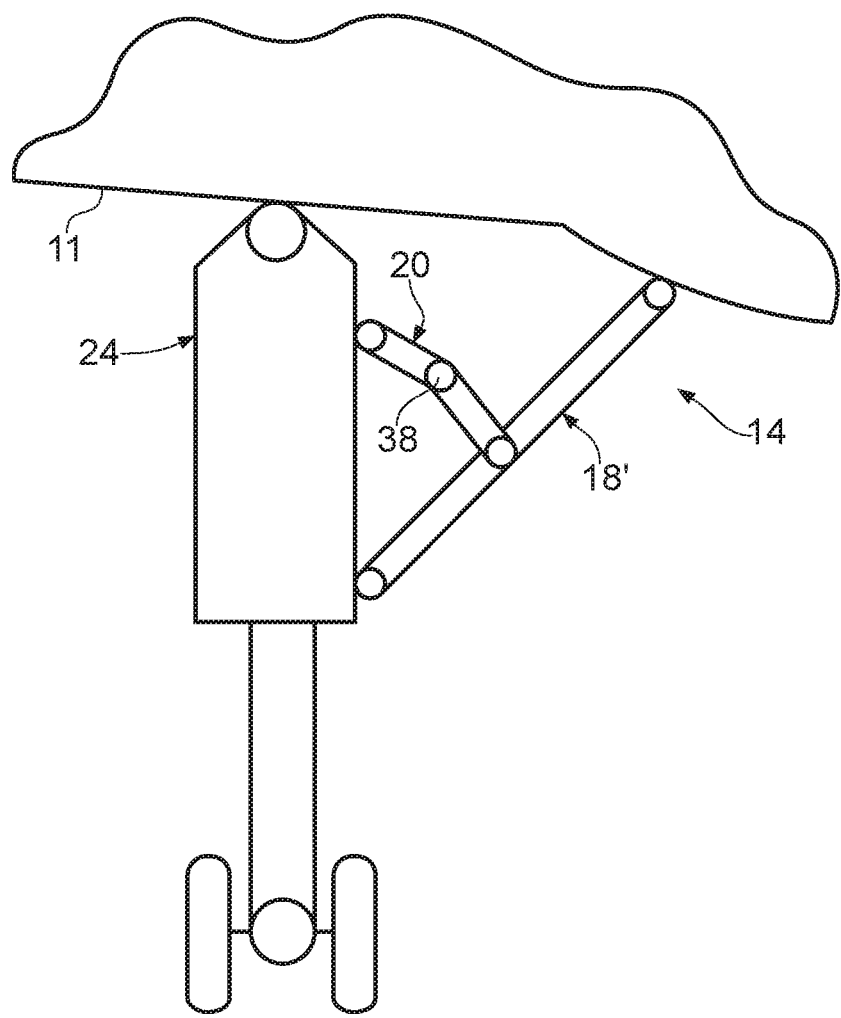
Figure 2D:
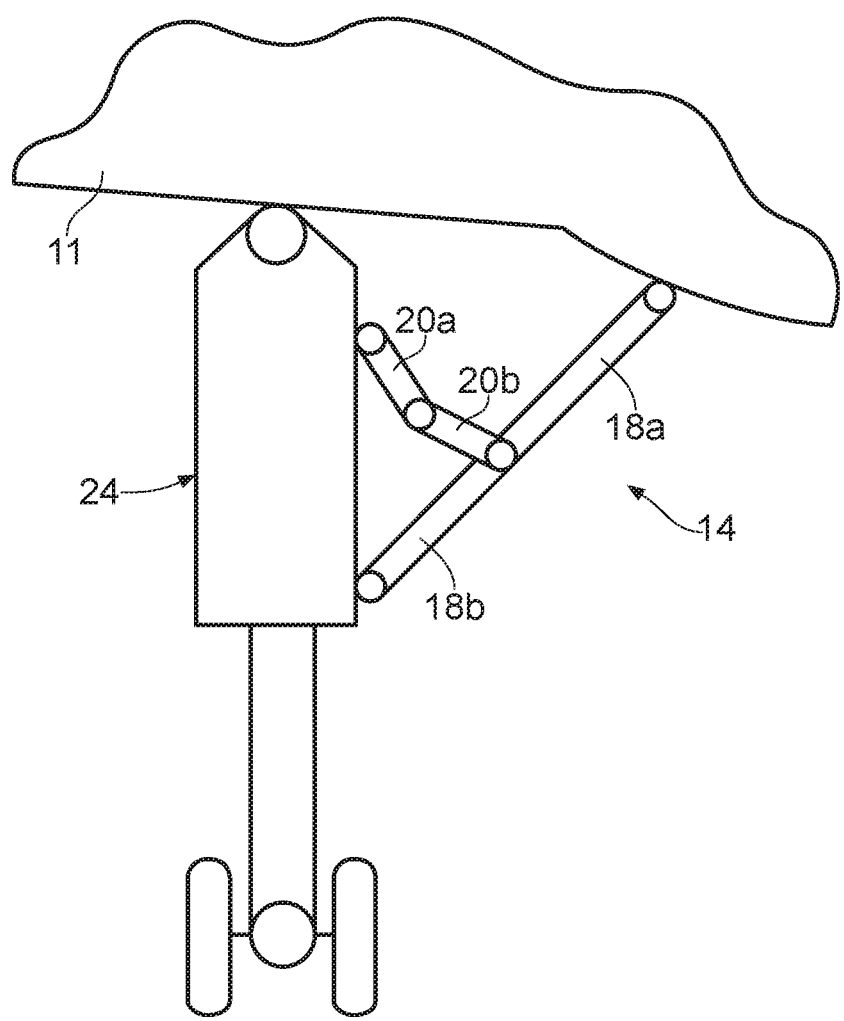

When the lock link 20 is in the locked condition, as illustrated in FIG. 2d, e, the upper and lower link arms 20a, 20b are generally longitudinally aligned or coaxial, and can be 'over-centre', such that the lock link 20 is arranged to oppose a force attempting to fold the stay 18, so as to move the landing gear assembly from the deployed condition towards the stowed condition. The lock link 20 must be broken to enable the stay 18 to be folded, thereby permitting the main fitting 26 to be moved by the retraction actuator towards the stowed condition.

One or more down lock springs 22 are generally provided to assist in moving the landing gear assembly to the deployed condition and locking it in that state by making the lock link. Down lock springs 22 also inhibit the lock link accidentally being unlocked. Down lock springs 22 are generally titanium alloy coil springs, which can be coupled between the lock link and another part of the landing gear assembly, such as an arm of the stay assembly, as shown in FIGS. 2b and 2e.

The spring assembly 22 is arranged to bias the lock link 20 towards the locked condition by way of spring tension. A distal end of the spring 22a is coupled to the lower stay arm 18b via a lower engagement formation 22b which in turn is coupled to an anchor point defined by the lower connector 22c.

Figure 2E:
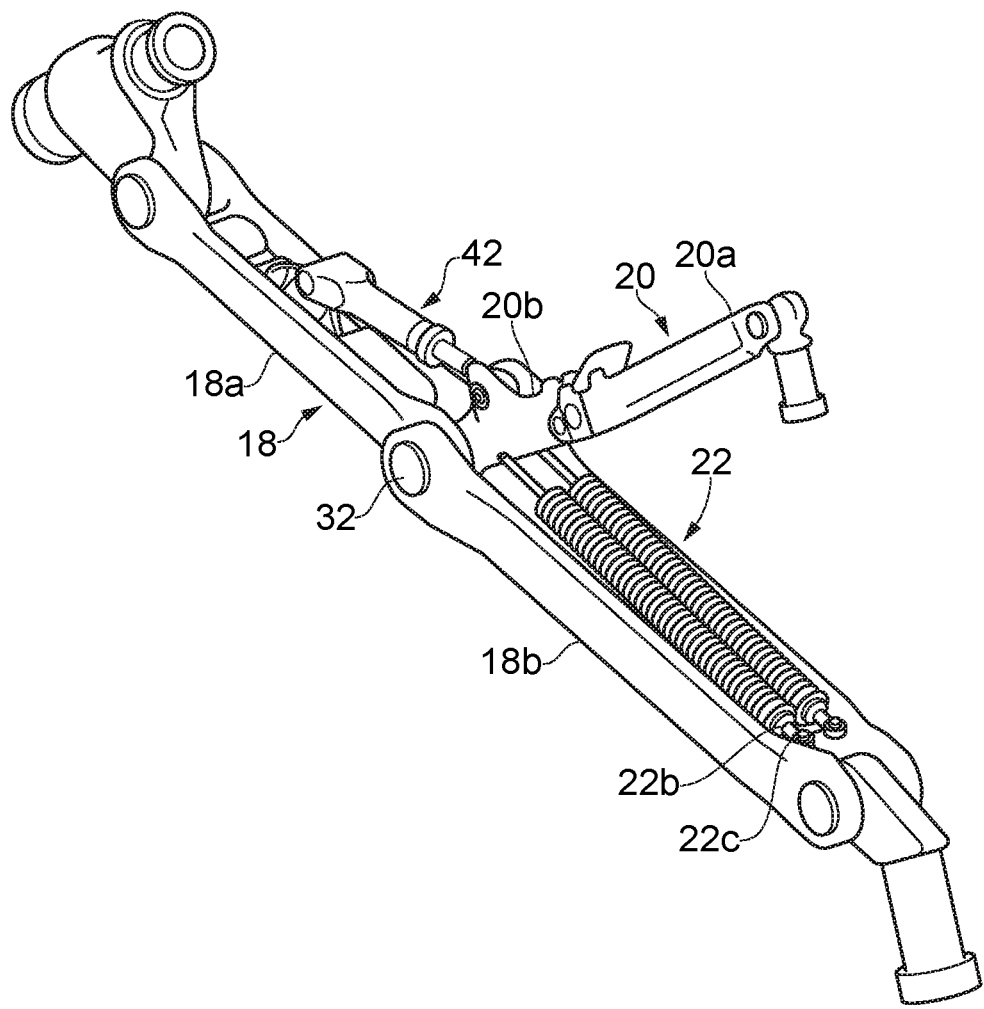

The coil spring of the spring assembly 26 is at its shortest when the landing gear assembly is in the deployed condition, as shown in FIG. 2e, and at its longest when the landing gear assembly approaches the stowed condition, as shown in FIG. 2b. As the landing gear assembly is retracted towards the stowed condition, the spring of each spring assembly extends, resulting in increased spring load and torsional stress.

Referring to FIG. 2e, a lock stay actuator 42 is coupled between the upper stay arm 18a and lower link arm 20b and arranged to pivotally move the link arms 20a, b so as to 'lock' and 'unlock' the lock link 20, as illustrated in FIG. 2c. The actuator 42 can break the lock link 20 against the down lock spring bias, allowing the landing gear assembly to be folded and stowed as described previously.

As will be appreciated from the above, various aircraft assemblies include a first part which is movable relative to a second part. An aircraft assembly can also include one or more hoses or cables for conducting fluid or electricity respectively to one or more components of the assembly. For brevity such hoses or cables will be referred to herein as conduits. As the first part of the assembly moves relative to the second part, it can cause the conduit to move through a movement volume from a first conduit position to a second conduit position. Such conduits can be referred to as dynamic conduits. An aircraft assembly can also include components such as sensors, brackets and the like which are coupled to the assembly via one or more mechanical fasteners; for example, by way of nut and bolts.

Figure 3:
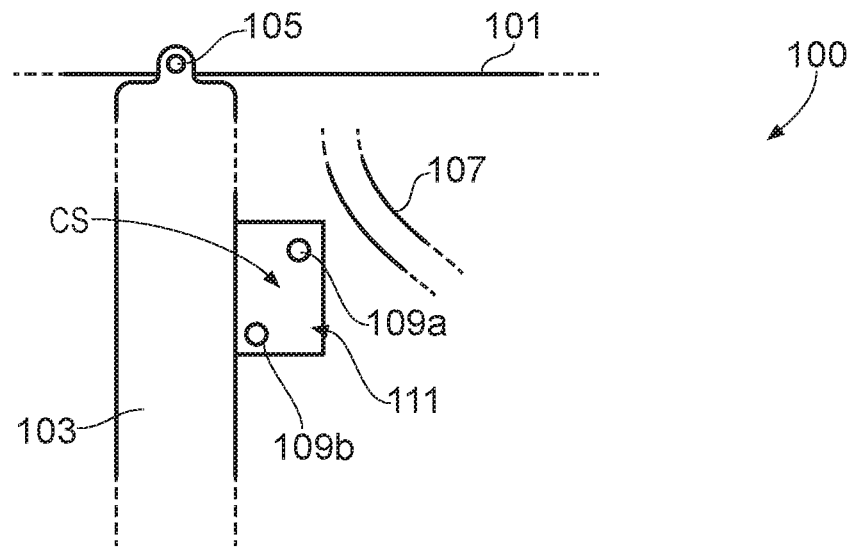
FIG. 3 is a diagram an aircraft assembly, showing a dynamic conduit in a first conduit position.

FIG. 3 shows part of an aircraft assembly 100. The aircraft assembly 100 includes a first part, which in this example is part of the airframe 101, and a second part, which in this example is a main landing gear shock absorbing strut 103. The shock absorbing strut 103 is movably mounted relative to the airframe 101 via a pivot pin 105.

The aircraft assembly 100 also includes a dynamic conduit 107. The dynamic conduit 107 is arranged such that movement of the shock absorbing strut 103 relative to the airframe 101 causes the dynamic conduit 107 to move through a movement volume MV from a first conduit position, shown in FIG. 3, to a second conduit position, shown in FIG. 4.

The aircraft assembly 100 also includes first and second fasteners 109a, 109b arranged to couple a component 111 such as a sensor or bracket to another part of the assembly 100. In other examples just a single fastener or more than two fasteners may be provided to mount the component.

Figure 5:
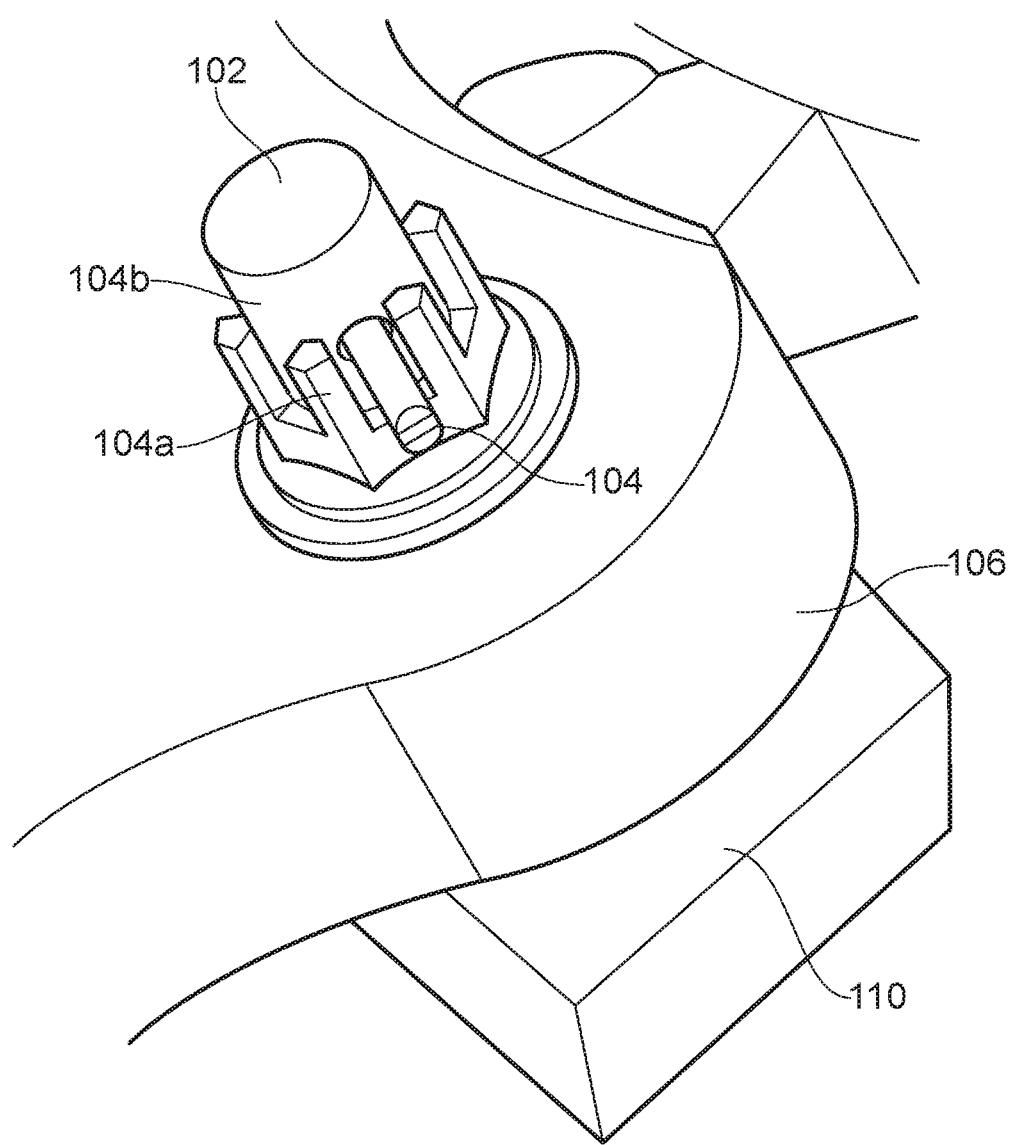
FIG. 5 is diagram of an aircraft assembly, showing a fastener.

Referring additionally to FIG. 5, an example of a fastener is shown in more detail. A threaded rod 102 is attached to part 110 and extends through a second part 106. A nut 104 is wound along the rod 102 to force the two parts 106, 110 together. The rod 102 includes a hole that extends laterally from one side of the rod 102 to the other. The nut 104 has an axial face configured to define castellations 104a. The nut 104 can be wound along the rod 102 until the hole is axially aligned with a space 104b between adjacent castellations 104a. A split pin 108 can then be inserted through the hole so that the split pin 108 inhibits rotation of the nut 104 due to engagement with the castellations 104a.

Figures 6A, 6B:
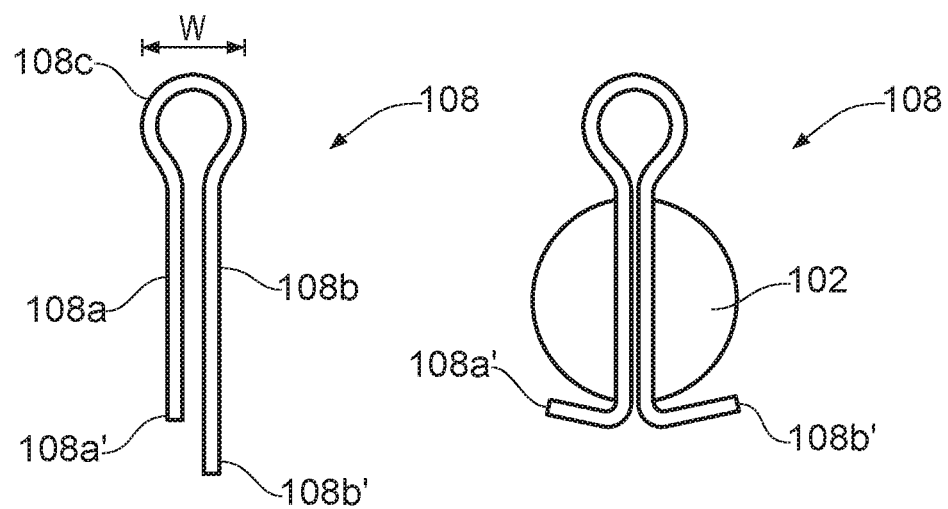
FIGS. 6a and 6b are diagrams of a split pin in an insertion condition and a splayed condition respectively.

Referring additionally to FIGS. 6a and 6b, a split pin 108 is shown in more detail. In FIG. 6a the split pin 108 is shown in a default insertion condition. The split pin 108 consists of a single piece of metal wire bent into two elongate, parallel arms 108a, 108b connected to one another via a head region 108c. The head region 108c is generally circular in shape and defines an end stop arranged to limit travel of the split pin 108 through the hole. Once sufficiently inserted, the free ends 108a', 108b' of the split pin 108 are bent or splayed apart to put the pin 108 in an installed condition which inhibits removal of the split pin 108, as shown in FIG. 6b.

The ends 108a', 108b' of the pin 108 can be sharp. Although the bent portions can be made to roughly conform to the outer surface of the rod 102, they can nevertheless catch skin, clothing or other relatively soft articles such as the dynamic conduit 107, causing damage to them. Such contact also has the potential to weaken the spayed pin arms which if sheared could result in the pin 108 falling out of the hole, enabling the nut 104 to unintentionally unwind from the rod 102.

Figure 4:
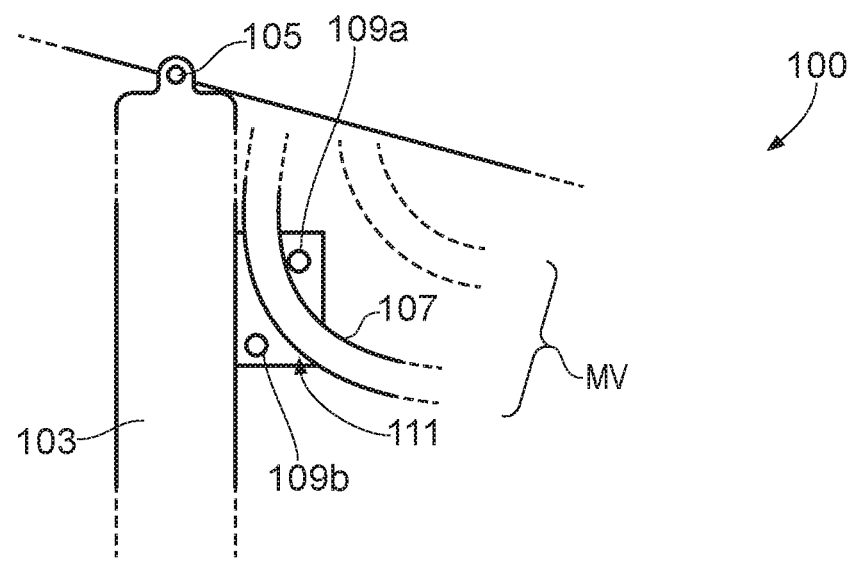
FIG. 4 is a diagram the aircraft assembly of FIG. 3, showing the dynamic conduit in a second conduit position.

Referring back to FIGS. 4 and 5, the first fastener 109a resides within the movement volume MV of the dynamic conduit 107. As such, when the dynamic conduit 107 moves through the movement volume MV to a second conduit position as shown in FIG. 4, it can contact sharp surfaces of the fastener 109a, causing abrasion of the dynamic conduit 107. The dynamic conduit 107 can also contact the surface CS of the aircraft assembly 100 between the fasteners 109a, 109b, which can be rough or can include sharp edges, causing abrasion of the dynamic conduit 107. If the dynamic conduit 107 is provided with a braided protective sheath, the sharp surfaces of the fastener can also unpick the strands of the braid. In other cases, some or all of both fasteners 109a, 109b can reside within the movement volume MV.

Figure 7:
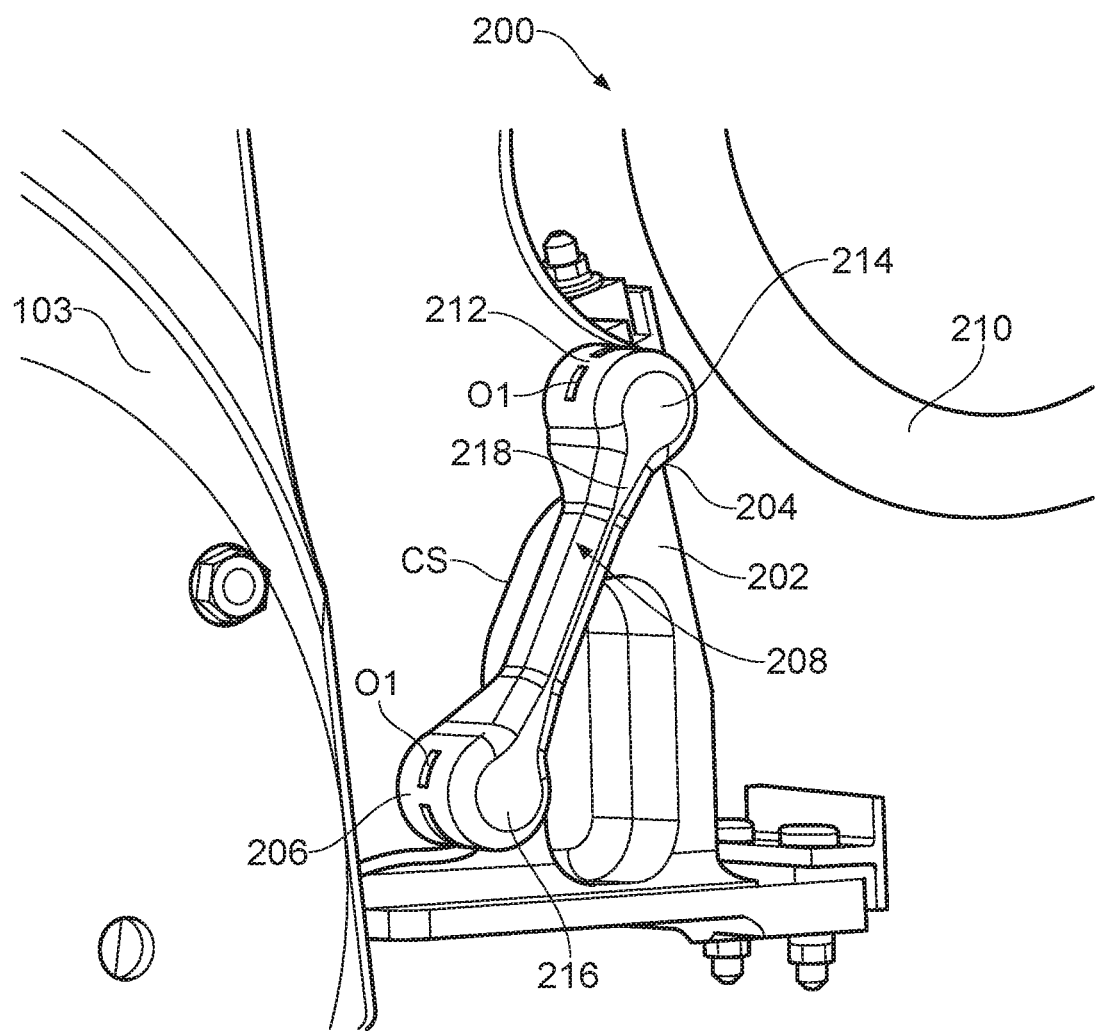
FIG. 7 is a diagram of an aircraft assembly according to an embodiment of the invention, showing a dynamic conduit in a first conduit position.
Figure 8:
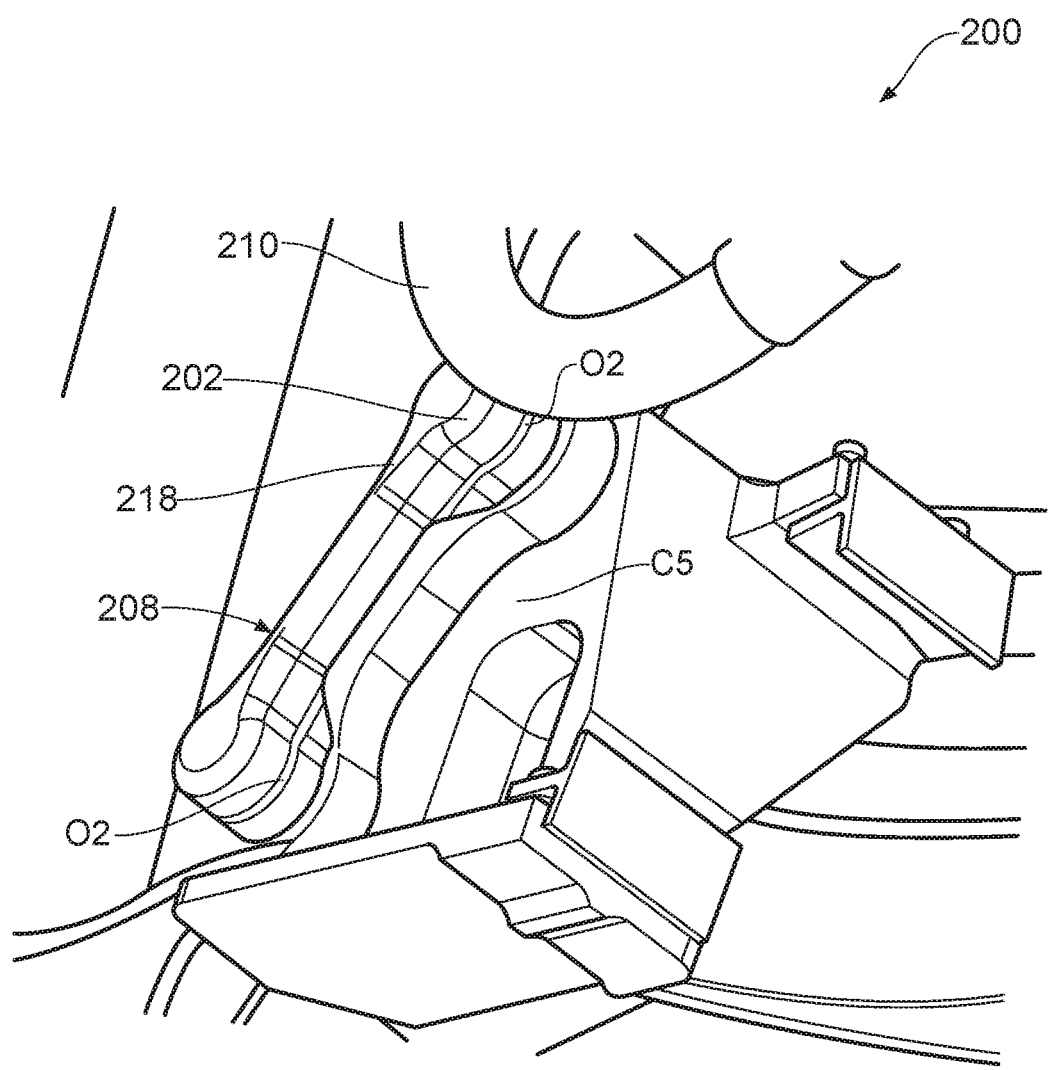
FIG. 8 is a diagram of the aircraft assembly of FIG. 7, showing the dynamic conduit in a second conduit position.
Figure 9:
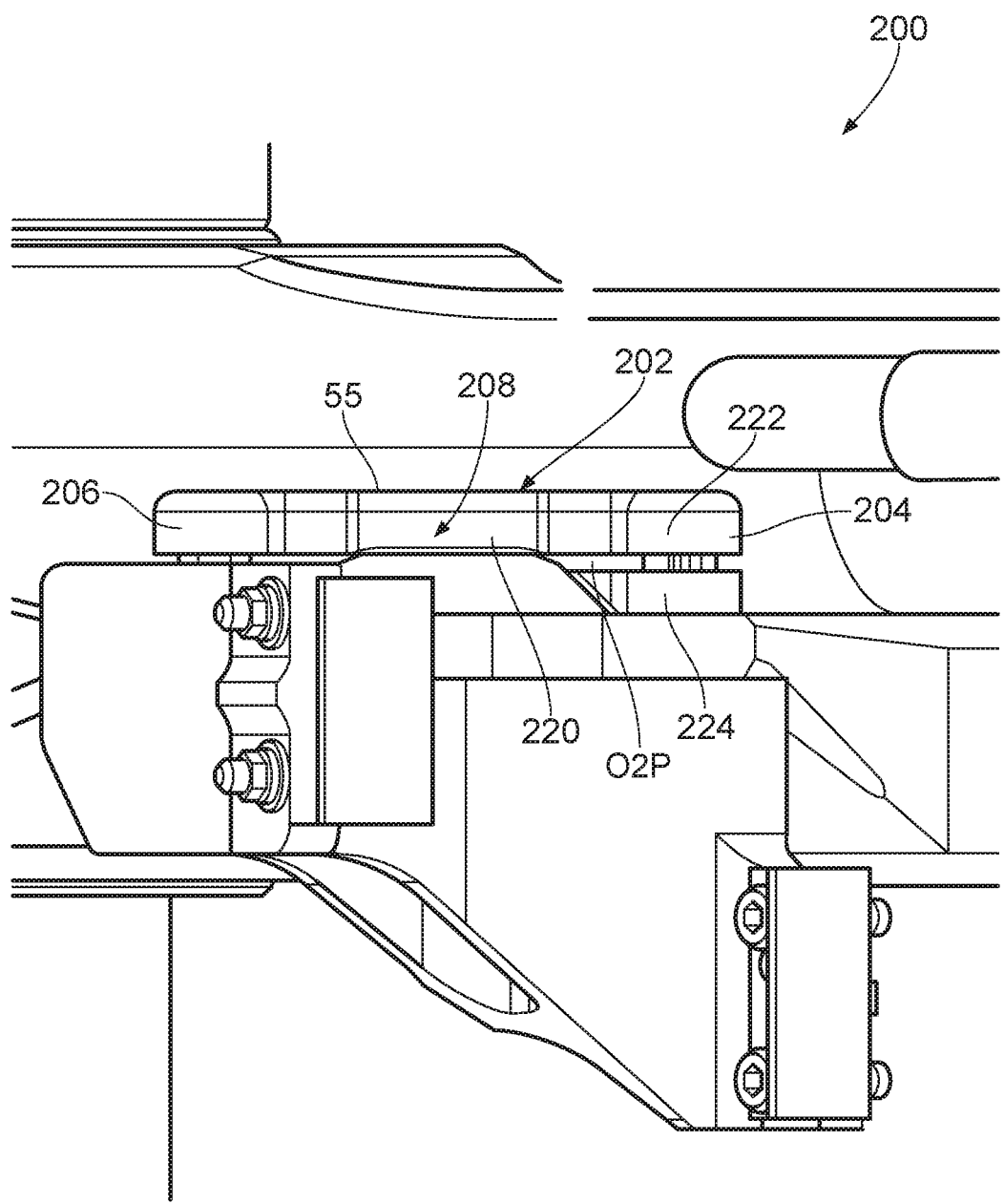
FIG. 9 is a side elevation of the aircraft assembly of FIG. 7 focusing on the safety guide.

FIGS. 7 to 9 show an aircraft assembly according to an embodiment of the invention generally at 200. The assembly 200 differs from the assembly 100 described above in that the fasteners have been covered by a safety guide 202.

The safety guide 202 comprises a first cap portion 204 arranged to be mounted on the first fastener (not visible), a second cap portion 206 arranged to be mounted on the second fastener (not visible), and a bridge portion 208 which extends between and connects the first cap portion 204 and the second cap portion 206.

At least some of the bridge portion 208 resides within the movement volume of the dynamic conduit 210. The safety guide 202 caps the pair of fasteners to prevent the dynamic conduit 210 from contacting sharp surfaces of the fasteners. The safety guide 202 also provides an elevated guide bridge 208 between the fasteners which can prevent the dynamic conduit 210 from contacting the surface CS of the aircraft assembly between the fasteners. This can reduce dynamic conduit abrasion relative to known arrangements.

The bridge portion 208 can have any shape which connects the cap portions 204, 206. It is however preferred that the bridge portion 208 is shaped to provide a smooth dynamic conduit transition across the safety guide 202; for example, the bridge portion 208 can have a generally flat upper, bearing surface with smooth corners connecting to side walls. The central region of the bridge portion 208 can be thin in comparison to the outer diameter of the cap portions 204, 206 as this can reduce the weight of the safety guide 202. Taper surfaces connecting the central region to the cap portions 204, 206 can provide a smooth conduit transition. The bridge portion 208 can have a generally planar supporting surface 218 arranged, in use, to act as a bearing surface for the dynamic conduit 210 as it moves though the movement volume along the bridge portion 208.

As shown in FIG. 9, the bridge portion 208 can be coupled to each cap portion 204, 206 at or adjacent to the top of each cap portion 204, 206. This can prevent the dynamic conduit 2010 from 'bumping' over a cap portion 204, 206 when moving though the movement volume along the bridge portion 208, thereby reducing abrasion.

The cap portions 204, 206 each have a generally cylindrical side wall 212 that is open at its bottom axial end. The bore of each cap portion 204, 206 is sized to receive a rod, such as the rod 102 of FIG. 5.

In other embodiments, the cap portions 204, 206 can include one or more non-cylindrical sidewalls; for example the cap portions 204, 206 can have a generally rectangular or hexagonal cross section.

One end of the side wall 212, which corresponds to the top of the cap portion 204, 206 in use, extends radially inwardly to define a top 214, 216 configured to inhibit passage of a rod so as to define an end stop against which the tips of the rods can engage when the cap portions 204, 206 are properly seated.

The side wall 212 includes a first opening O1 which extends through the thickness of the side wall 212 to provide a passageway between the bore of the cap portions 204, 206 and the outside environment. The first opening O1 is sized to receive an appropriate split pin when in its default configuration as shown in FIG. 6a. The opening O1 can for example have a length that is between 1.1 and three times the diameter of the pin 108. In practice, the free end portions of the arms 108a, 108b can be clipped following assembly to leave convenient lengths.

It is preferred that the first opening O1 is in the form of an elongate slot which extends in an orthogonal plane with respect to the bore axis and is sized to receive the split pin head 108c of width W so that the head 108c can be shielded by the cap portions 204, 206.

The side wall 212 also includes a second opening O2 on the opposite side with respect to the first opening O1. The second opening O2 extends through the thickness of the side wall 212 to provide a passageway between the bore of the cap portions 204, 206 and the outside environment. The second opening O2 is sized to receive at least some of the splayed arms of an appropriate split pin when in the bent configuration as shown in FIG. 6b.

It is preferred that the second opening O2 is in the form of an elongate slot which extends in an orthogonal plane with respect to the bore axis BA and is preferably sized to receive the tips 108a', 108b' of the arms 108a, 108b when installed such that the tips 108a', 108b' can be shielded by the cap portions 204, 206 to inhibit them catching relatively soft articles that come into contact with one of the cap portions 204, 206. This arrangement also provides increased surface area which works with the assembled split pin to inhibit removal of one of the cap portions 204, 206. The slot O2 can extend between a quarter and half way around the side wall 212, and can include a portion O2P which extends along a side wall 220 of the bridging portion 208.

In use, the cap portions 204, 206 are placed on top of the fasteners. The first opening O1 of each cap portion is configured to be aligned with one side of the lateral hole through the respective rod 102. Thus, a split pin 108 can be inserted through each lateral hole. Once fully inserted, the free ends 108a', 108b' of the pins 108 protrude from the cap portions 204, 206 through the second opening O2, as shown in FIG. 7. The protruding portions of the arms 108a, 108b can then be bent backwards towards the rod 102 such that at least the tips 108a', 108b', and in some cases the entire protruding portions of the arms 108a, 108b, are received within the recess defined by the elongate second opening O2.

Advantageously, the first opening O1 and second opening O2 enable split pins 108 to retain the cap portions 204, 206 on the rods due to the portions of the split pin 108 which reside within the openings O1, O2. The body of the cap portions 204, 206 therefore defines retention portions 307, 309 situated between the openings O1, O2 on the one hand and the bottom edge of the cylindrical side wall 212 on the other hand, the retention portions 222, 224 serving to retain the cap portions 204, 206 on the rod 102 when the split pin 108 is in the installed condition.

In other embodiments, the second opening can be similar in size and shape to the first opening, in which case the cap can be provided with one or more recesses, which can be bind holes or can extend fully through the side wall(s), to receive the free ends of the pin when in the installed condition.

The inner side walls of the cap portions which define the bore can be arranged so as to have a generally hexagonal cross section to provide a bore which conforms to the shape of a nut.

It should be noted that a cap portion can be provided with a bore arranged to conform to the outer sidewall profile of a fastener upon which the cap portion is intended to be mounted. Where a hexagonal nut is used it can be advantageous for at least the cap portion(s) to be formed by additive layer manufacturing to enable a hexagonal bore to be formed.

Figure 10:
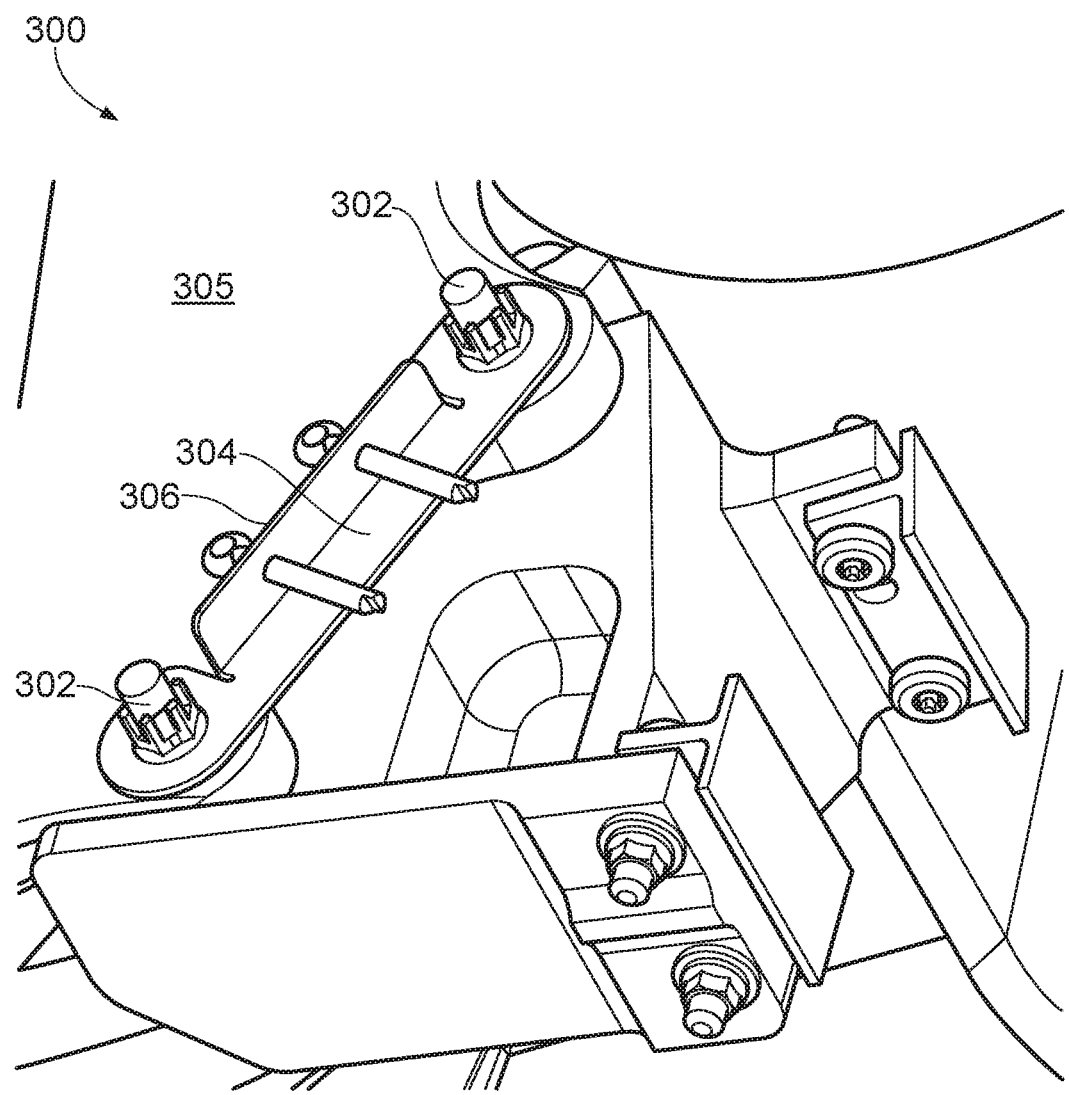
FIG. 10 is a diagram of an aircraft assembly according to a further embodiment of the invention.
Figure 11:
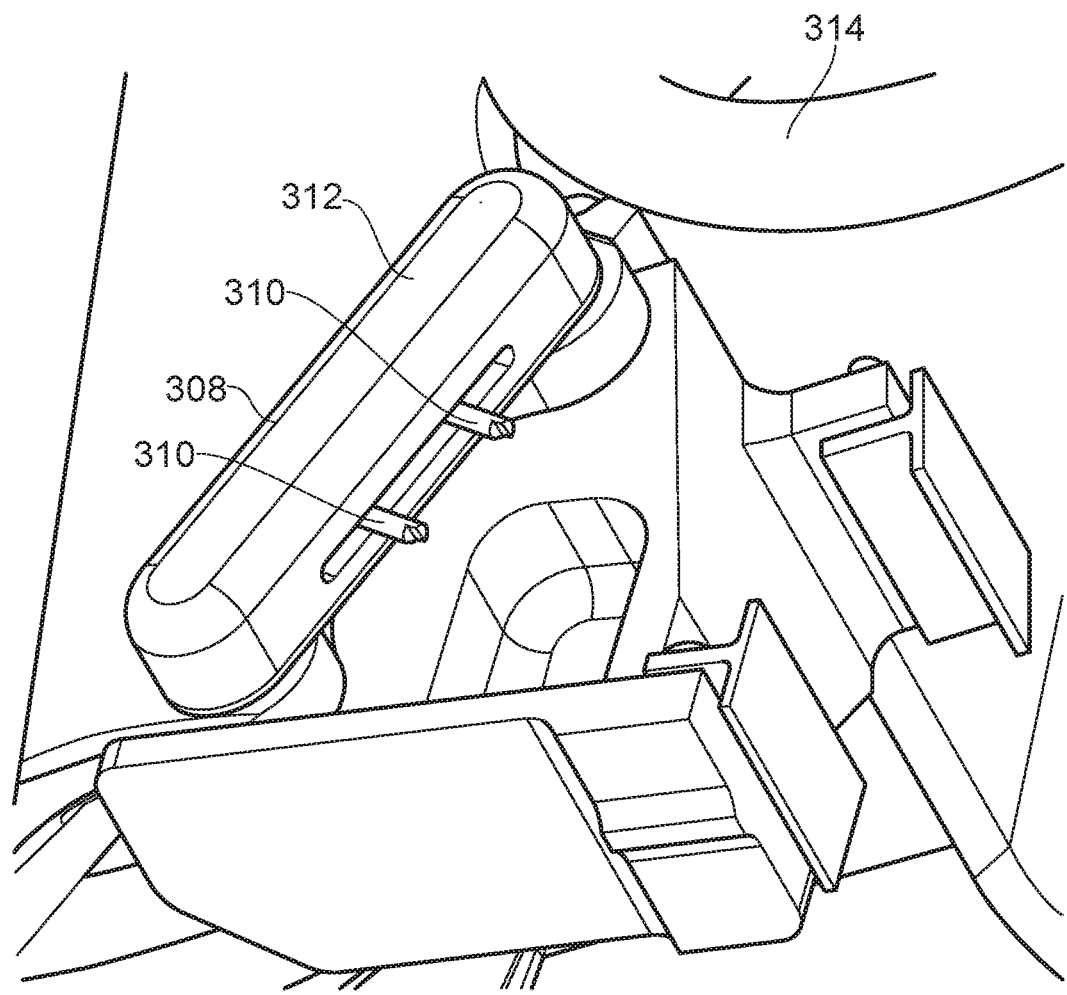
FIG. 11 is a diagram of the aircraft assembly of FIG. 10.

FIGS. 10 and 11 show an aircraft assembly 300 according to a further embodiment in which the fasteners 302 are used to retain a mounting bracket 304 adjacent a surface of the first part 305. The capsule shaped bridge portion 308 defines a cover which both encases the fasteners 302 and defines the bearing surface 312 for supporting the dynamic conduit 314 as it moved from the first position P1 to the second position P2. The mounting bracket 304 is provided with a flange 306 which overlaps a corresponding flange (not shown) on the bridge portion 308 when the two parts are placed together such that split pins 301 can be inserted through aligned holes on each flange to hold the bridge portion 308 next to the mounting bracket 304. Thus, the safety guide is formed as two pieces which can be held together by the split pins. The mounting bracket 304 and bridge portion 308 can have any suitable shape and can be coupled to one another by any suitable means such as screws or the like. The mounting bracket 304 and bridge portion 308 can be fixed in place by and cover just one of the fasteners.

In other embodiments, the safety guide can take any suitable form in which it is arranged to be coupled to the first fastener and comprises a bridge portion which extends away from the first fastener within the movement volume of the dynamic conduit so as to support the dynamic conduit when the dynamic conduit is in the second conduit position.

A safety guide according to embodiments of the invention can be formed from any suitable material, such as a plastics or metallic material. Preferably, the material is chosen to provide a robust, lightweight, low friction cover; for example, a plastic such as nylon or polyoxymethylene. In other embodiments a metal such as aluminum can be chosen to provide a stiff, lightweight cover.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
a first part;
a second part, the first part being movably mounted relative to a second part;
a dynamic conduit arranged such that movement of the first part relative to the second part causes the dynamic conduit to move through a movement volume from a first conduit position to a second conduit position;
a first fastener arranged to couple a component to the aircraft assembly, at least some of the first fastener residing within the movement volume of the dynamic conduit;
a safety guide arranged to be coupled to the first fastener, the safety guide comprising a bridge portion which extends away from the first fastener within the movement volume of the dynamic conduit so as to support the dynamic conduit when the dynamic conduit is in the second conduit position; and
a second fastener, wherein the safety guide comprises a first cap portion arranged to be mounted on the first fastener and a second cap portion arranged to be mounted on the second fastener, the bridge portion extending between and connecting the first cap portion and the second cap portion.

2. The aircraft landing gear assembly according to claim 1, wherein the bridge portion is coupled to each cap portion at or adjacent to the top surface of each cap portion.

3. The aircraft landing gear assembly according to claim 1, wherein the bridge portion has a substantially planar supporting surface arranged in use to act as a bearing surface for the dynamic conduit as it moves along the bridge portion.

4. The aircraft landing gear assembly according to claim 1, wherein at least a central portion of the bridge portion is relatively narrow in comparison to the outer width of the cap portions.

5. The aircraft landing gear assembly according to claim 1, wherein the width of the bridge portion tapers inwardly from the cap portions towards the relatively narrow central portion.

6. The aircraft landing gear assembly according to claim 1, wherein the safety guide is arranged to be removably attached to the fasteners.

7. The aircraft landing gear assembly according to claim 1, wherein the safety guide is of unitary construction.

8. The aircraft landing gear assembly according to claim 1, wherein the bridge portion has a planar supporting surface arranged in use to act as a bearing surface for the dynamic conduit as it moves along the bridge portion.

9. The aircraft landing gear assembly according to claim 1, wherein the safety guide comprises a bore arranged to surround the first fastener, and the bridge portion comprises an elongate portion that extends away from the fastener in a lengthwise direction from the bore.

10. The aircraft landing gear assembly according to claim 1, wherein each cap portion has a body comprising one or more side walls which together define a bore arranged to receive an end portion of a threaded rod of one of the fasteners, the body further comprising diametrically opposing first and second openings formed through the one or more side walls, each opening being sized to receive the arms of a split pin of the fastener when the split pin is in an insertion condition to permit the arms of the split pin to be inserted through a lateral hole through the rod, and at least one recess sized to receive the free ends of the split pin when the split pin is in an installed condition, wherein the body includes a retention portion situated between the first opening and an end face of the one or more side walls, the retention portion serving to retain the cap on the rod when the split pin is in the installed condition.

11. The aircraft landing gear assembly according to claim 10, wherein the second opening extends in a substantially orthogonal plane with respect to the axis of the bore.

12. The aircraft landing gear assembly according to claim 10, wherein the body comprises a substantially cylindrical side wall.

13. The aircraft landing gear assembly according to claim 10, wherein inner sidewalls of the body which define the bore are configured to define a bore with a substantially hexagonal cross section.

14. The aircraft landing gear assembly according to claim 10, wherein the aircraft assembly comprises an aircraft landing gear assembly.

15. The aircraft landing gear assembly according to claim 10, wherein the second opening extends in a orthogonal plane with respect to the axis of the bore.

16. The aircraft landing gear assembly according to claim 10, wherein the body comprises a cylindrical side wall.

17. The aircraft landing gear assembly according to claim 10, wherein inner sidewalls of the body which define the bore are configured to define a bore with a hexagonal cross section.

18. A method of forming an aircraft landing gear assembly, the method comprising:
providing an aircraft assembly comprising: a first part; a second part, the first part being movably mounted relative to a second part; a dynamic conduit arranged such that movement of the first part relative to the second part causes the dynamic conduit to move through a movement volume from a first conduit position to a second conduit position; first and second fasteners arranged to couple one or more components to the assembly, at least some of at least one of the fasteners residing within the movement volume of the dynamic conduit;
providing a safety guide, the safety guide comprising:
a first cap portion arranged to be mounted on the first fastener; a second cap portion arranged to be mounted on the second fastener; and a bridge portion extending between and connecting the first cap portion and the second cap portion, at least some of the bridge portion residing within the movement volume of the dynamic conduit; and
placing the safety guide on one or both of the pair of fasteners.

19. The method according to claim 18, further comprising:
inserting a split pin through first and second cap openings of both cap portions and respective lateral holes through rods of the fasteners; and
bending the free ends of the split pins into respective one or more recesses in the respective cap portions.

20. An aircraft landing gear assembly comprising:
a first part;
a second part, the first part being movably mounted relative to a second part;
a dynamic conduit arranged such that movement of the first part relative to the second part causes the dynamic conduit to move through a movement volume from a first conduit position to a second conduit position;
a first fastener arranged to couple a component to the aircraft assembly, at least some of the first fastener residing within the movement volume of the dynamic conduit; and
a safety guide arranged to be coupled to the first fastener, the safety guide comprising a bridge portion which extends away from the first fastener within the movement volume of the dynamic conduit so as to support the dynamic conduit when the dynamic conduit is in the second conduit position;
wherein the safety guide comprises a bore arranged to surround the first fastener, and the bridge portion comprises an elongate portion that extends away from the fastener in a lengthwise direction from the bore.

* * * * *